Patented Feb. 3, 1931

1,791,068

UNITED STATES PATENT OFFICE

HERMAN D. WENDT, OF WEST CHESTER, PENNSYLVANIA, ASSIGNOR TO THE SHARPLES SEPARATOR COMPANY, OF WEST CHESTER, PENNSYLVANIA, A CORPORATION OF PENNSYLVANIA

CREAM PROCESS AND ARTICLE   REISSUED

No Drawing.   Application filed February 4, 1930. Serial No. 425,903.

The present invention relates to certain improvements in a process of preparing cream, and to a cream article produced according to the process.

As is well known, in the dairy industry milk has heretofore been treated to separation by standing or in a centrifugal machine for the removal of the milk fat therefrom as a cream. Milk from cows has a composition including from around 3% to 5% of milk fat which is in the form of minute globules scattered throughout the body of the milk. On standing alone, these globules rise to the surface since they are of lesser specific gravity than the remaining parts of the milk, and carry with them a certain proportion of the milk as a vehicle. The cream which can be skimmed off after such standing comprises the original globules of milk fat separated by films of the remaining ingredients of the milk. This fat, therefore, is in the dispersed phase, i. e., the fat globules are not in contact with one another, but are in substantially their original emulsion and held separated one from another by the remaining portions of the milk, being the so-called "skimmed milk".

With centrifugal machines, this removal of the cream from the milk may be accomplished more quickly, and by properly designed machines, the proportion of cream to skimmed milk as a vehicle in the product obtained, may be varied within certain limits as desired. Thus, it is possible to produce cream of 30% milk fat, or even "double creams" running as high as 50% and 60% of milk fat. With very careful control of the operations, it is even possible to produce a cream running as high as 65% in milk fat. These creams, however, are more or less viscous liquids in each event.

According to the process of the present invention, however, it is proposed to produce a new article which has all the characteristics of a cream and will hereinafter be denominated a "cream", since it comprises milk fat particles in the dispersed phase and held apart by a liquid vehicle. It differs, however, from standard creams in that the percentage of milk fat is higher than normal, and in the fact that it is a coherent plastic product at temperatures below the melting point of milk fat. This super-cream of the present invention may, therefore, be regarded as a plastic product with the milk fat in its original emulsion as the dispersed phase and with the solids not fat in approximately their natural proportions.

The article thus produced is adapted for preservation for long periods of time, and may be pasteurized or sterilized during the procedure, and may be standardized by the addition of proper proportions of skimmed or whole fresh milk, whereby results a product immediately available for use as a table or whipping cream, of for use in ice cream, etc. By reason of the existence of the milk fat in the dispersed phase in this plastic super-cream product, said milk fat is distributed in normal manner in the reconverted product thus produced.

According to the present invention, a milk is submitted to a centrifugal action of the usual type whereby to remove the milk fat portion as a cream. As set forth above, this operation results in the production of a cream containing from 18% to 40% of milk fat.

While I have described the use of a centrifugal machine as a means for obtaining a cream product containing from 18% to 40% milk fat, it will be understood, of course, that this cream product may be obtained in any well known way. After the cream product has been thus obtained, it is forewarmed or heated to a temperature sufficient to render the milk fat therein contained fluid. The product is then immediately passed into a centrifugal machine operated at less capacity and substantially higher speed, producing increased centrifugal force over that required in the first separation of cream from milk in the ordinary way.

This subjecting of the heated cream product to this second stage centrifugal separation results in the further removal of solids not fat and the liquid vehicle in a plastic product when cooled to below the melting point of the milk fat contained therein. This plastic product contains in excess of 65% milk fat, and without the coalescing of the milk fat globules to form particles of larger dimensions.

The remaining portion of the vehicle in the plastic product remains as a film closely coating the milk fat globules and holding the particles of the milk fat in the dispersed phase. To this extent the final plastic product may be designated as a "super-cream". It will be understood, however, that the product is of much higher percentage in milk fat than creams heretofore produced by reason of the withdrawal of a large portion of the dispersing vehicle existing in the continuous phase in the emulsion. The emulsion is in a plastic form at temperatures below the melting point of the milk fat contained therein.

The product thus obtained containing 65% or more of milk fat is a plastic mass of a consistency resembling butter and equally adapted as a spread on bread, for example, or for cooking. However, this product differs from butter inasmuch as it may be directly standardized by the addition of skimmed or whole fresh milk to the desired percentage of carrying vehicle in the continuous phase of the emulsion.

Thus the milk fat particles may be again distributed as the dispersed phase throughout the body of the mixed liquid and a rich milk or cream thus produced By this process the milk products may be very efficiently stored and readily transported and reconverted for use as a rich milk, table cream, whipping cream, for ice cream, and for general purposes. It may also be converted into butter by applying pressure direct to the plastic mass as is more fully described and claimed in my copending application, Serial No. 425,904, filed of even date herewith. Again it may be converted into a cream suitable for churning and butter recovered therefrom by this well known method.

The super-cream as it flows from the centrifugal separator may be directed at once into packages for distribution and cooled and changed to its plastic form in such packages.

When it is desired to produce a pasteurized or sterilized product, the cream as it is received from the first centrifugal separator and when it is forewarmed or heated, is heated to a pasteurizing or sterilizing temperature, after which it is cooled to the desired temperature for the final step of separation wherein the butter fat is rendered fluid. The cream product may be pasteurized or sterilized prior to the forewarming, if desired. The essential step, however, is the pasteurizing or sterilizing of the cream product prior to subjecting the same to the final separation wherein the high content of milk fat is obtained. Any attempt to pasteurize this plastic super-cream product which is produced by my process would result in an oiling of the milk fat and changing of the phase of the super-cream so that it could not be kneaded to produce butter or directly reconverted into a table cream, whipping cream, etc.

My process is preferably applied as a continuous process. The milk is passed continuously through the first centrifugal separator, then through suitable forewarming means, and then through the second centrifugal separator and into the containers for shipment. It will be understood, of course, that the necessary cooling steps are applied partially cooling the product on the way to the container or for cooling the product in the container, so as to bring about the plastic condition of the super-cream product.

While I have described my plastic super-cream product as produced from milk, it will be understood, of course, that it may be produced from a standard 18% to 40% cream obtained in any desired way, in which case the first step of centrifugal separation would be unnecessary. This plastic super-cream product may be made into any suitable table spread as to the flavor of the product desired, such as produced by the addition of pure cultures or blended with other food products, using the super-cream as a base. It may also be subjected to a kneading process for the production of butter, as has been referred to above.

Having fully described my invention, what I claim as new and desire to secure by Letters Patent, is:—

1. As an article of manufacture a plastic cream containing not less than sixty-five percent of milk fat held in the natural dispersed phase by the original an natural liquid emulsion and wherein the solids not fat and the original liquid vehicle are retained in approximately their natural proportions.

2. The process of producing a plastic cream which consists in fore-warming or heating a cream to render the milk fat fluid while maintaining the integrity of the fat particles and the original emulsion holding the same in the dispersed phase, and subjecting said cream to a centrifugal separating force for removing sufficient of the liquid vehicle so as to produce when cooled a plastic mass of dispersed milk fat particles.

In testimony whereof, I affix my signature.

HERMAN D. WENDT.